(12) United States Patent
Trujillo et al.

(10) Patent No.: US 11,110,797 B2
(45) Date of Patent: Sep. 7, 2021

(54) FLUID DEMARCATION INSTRUMENT CLUSTER

(71) Applicant: Continental Automotive Systems, Inc., Auburn Hills, MI (US)

(72) Inventors: Diego Trujillo, Jalisco (MX); Guillermo Figueroa, Jalisco (MX); Cristina Gascón, Jalisco (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/701,764

(22) Filed: Dec. 3, 2019

(65) Prior Publication Data
US 2020/0198469 A1    Jun. 25, 2020

Related U.S. Application Data

(60) Provisional application No. 62/783,826, filed on Dec. 21, 2018.

(51) Int. Cl.
*B60K 37/02*   (2006.01)
*B60K 35/00*   (2006.01)

(52) U.S. Cl.
CPC .............. *B60K 37/02* (2013.01); *B60K 35/00* (2013.01); *B60K 2370/188* (2019.05); *B60K 2370/33* (2019.05); *B60K 2370/6992* (2019.05)

(58) Field of Classification Search
None
See application file for complete search history.

(56) References Cited

U.S. PATENT DOCUMENTS

| | | | |
|---|---|---|---|
| 3,643,510 A * | 2/1972 | Lissau | G01L 19/04 73/708 |
| 2016/0082876 A1 * | 3/2016 | Dyer | G01F 23/00 340/441 |

* cited by examiner

*Primary Examiner* — John F Mortell

(57) ABSTRACT

A gauge assembly according to this disclosure includes a dial a dial face defining a scale indicative of an operating parameter, a conduit containing a first fluid and a second fluid that are immiscible during normal operating conditions. The conduit arranged about a periphery of the scale, wherein a visible demarcation between the first fluid and the second fluid is movable to correspond with the current operating parameter indicated on the scale.

20 Claims, 3 Drawing Sheets

FLUID DEMARCATION INSTRUMENT CLUSTER

CROSS REFERENCE TO RELATED APPLICATION

This application claims priority to U.S. Provisional Application Ser. No. 62/783,826 filed on Dec. 21, 2018.

TECHNICAL FIELD

The present disclosure relates to vehicle instrument panels and clusters, and more specifically to a vehicle instrument panel that includes hydro-mechanical features for visually indicating a vehicle operating parameter.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. Conventional instrument panels include gauges with pointers that move to indicate a current vehicle operating parameter. Although the primary purpose of an instrument cluster is to convey information, the instrument cluster is also a design feature that contributes to the visual aesthetic of the vehicle. Accordingly, vehicle manufacturers are continually seeking ways to improve consumer interest and provide different aesthetic features within a vehicle.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle instrument cluster according to an exemplary embodiment of this disclosure, among other possible things includes a gauge including a dial face defining a scale indicative of a vehicle operating parameter and a conduit containing at least one fluid disposed relative to the scale, the at least one fluid in the conduit including a visible demarcation that is adjusted to correspond with the current vehicle operating parameter indicated on the scale.

In a further embodiment of the foregoing vehicle instrument cluster, the at least one fluid comprises a first fluid and a second fluid that are immiscible at normal operating conditions In a further embodiment of any of the foregoing vehicle instrument clusters, the first fluid and the second fluid are of different densities to prevent mixing.

In a further embodiment of any of the foregoing vehicle instrument clusters, a first bellows controls movement of the first fluid and a second bellows controls movement of the second fluid and the visible demarcation is disposed between the first fluid and the second fluid and is positioned within the conduit to indicate the current vehicle operating condition.

In a further embodiment of any of the foregoing vehicle instrument clusters, a controller is in communication with the first bellows and the second bellows for controlling movement to adjust the visible demarcation relative to the scale.

In a further embodiment of any of the foregoing vehicle instrument clusters, a window is disposed within the dial face with the first bellows and the second bellows disposed proximate the window such that the first bellows and the second bellows are viewable through the window.

In a further embodiment of any of the foregoing vehicle instrument clusters, a pointer is movable to indicate on the scale that corresponds with movement of the visible demarcation between the first fluid and the second fluid.

In a further embodiment of any of the foregoing vehicle instrument clusters, the first fluid is of a first color and the second fluid is of a second color different than the first color.

In a further embodiment of any of the foregoing vehicle instrument clusters, the second color is clear relative to the first color.

In a further embodiment of any of the foregoing vehicle instrument clusters, a light is included for illuminating the conduit.

In a further embodiment of any of the foregoing vehicle instrument clusters, at least one of the first fluid and the second fluid is luminescent and illuminates in response to the light within the conduit.

In a further embodiment of any of the foregoing vehicle instrument clusters, the second fluid is not luminescent and remains clear in response to light within the conduit.

In a further embodiment of any of the foregoing vehicle instrument clusters, the scale is arranged circumferentially on the dial face and the conduit is disposed about a periphery of the scale.

In a further embodiment of any of the foregoing vehicle instrument clusters, the scale is arranged as a partial curvilinear shape and the conduit is disposed about an outer periphery of the partial curvilinear shape.

A gauge assembly for communicating an operating parameter according to another exemplary embodiment of this disclosure includes, among other possible things a dial a dial face defining a scale indicative of an operating parameter, a conduit containing a first fluid and a second fluid that are immiscible during normal operating conditions, the conduit arranged about a periphery of the scale, wherein a visible demarcation between the first fluid and the second fluid is movable to correspond with the current operating parameter indicated on the scale, a first bellows in communication with a first end of the conduit for moving the first fluid within the conduit and a second bellows in communication with a second end of the conduit for moving the second fluid within the conduit, wherein the first bellows and the second bellows are selectively expandable and collapsible to move a corresponding one of the first fluid and the second fluid to adjust a position of the visible demarcation relative to the scale.

In a further embodiment of the foregoing gauge assembly, the scale is arranged circumferentially on the dial face and the conduit is disposed about a periphery of the scale.

In a further embodiment of the foregoing gauge assembly, the scale is arranged as a partial curvilinear shape and the conduit is disposed about an outer periphery of the partial curvilinear shape.

In a further embodiment of the foregoing gauge assembly, the first fluid is luminescent and illuminates in response to the light within the conduit and the second fluid is not luminescent and remains clear in response to light within the conduit.

In a further embodiment of the foregoing gauge assembly, the first fluid is of a first color and the second fluid is of a second color different than the first color.

In a further embodiment of the foregoing gauge assembly, the scale is arranged as a curvilinear shape and the conduit is disposed about an outer periphery of the curvilinear shape.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
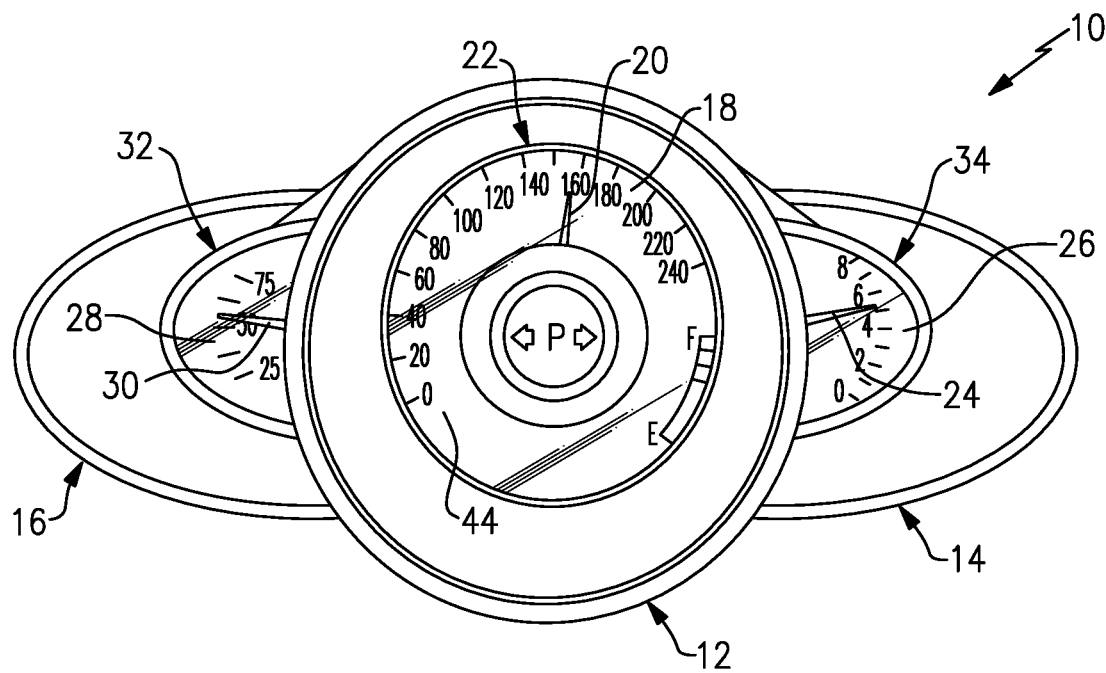
FIG. 1 is a front view of an example instrument panel for a vehicle.

Referring to FIG. 1, an example instrument cluster 10 for a motor vehicle is shown and has a speedometer 12, a tachometer 14 and an oil pressure gauge 16. The speedometer 12 includes a pointer 20 that moves relative to a dial face 18 to indicated vehicle speed on a scale 44. The tachometer 14 includes a pointer 24 that moves relative to a dial face 26 to indicate engine rpm. The oil gauge 16 includes a pointer 28 that moves relative to a dial face 30 to indicate engine oil pressure. Each of the gauges 12, 14, and 16 include conduits 22, 34 and 32 respectively that contain fluids that move to further illustrate and indicate the current value for each vehicle operating parameter. The conduits 22, 34 and 32 are disposed about an outer periphery of each corresponding dial face 18, 26 and 30 and include a visible demarcation that corresponds with movement of the corresponding pointers 20, 24 and 28. The liquid in the conduit 22, 34 and 33 provide an additional visual representation of the vehicle operating condition.

Figure 2:
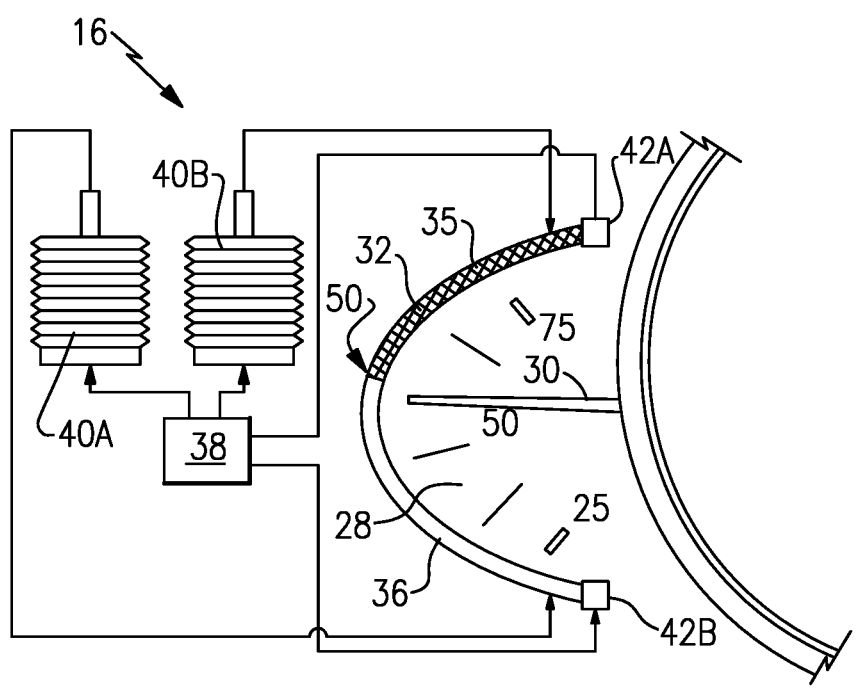
FIG. 2 is a schematic view of a portion of the example instrument panel.

Referring to FIG. 2 with continued reference to FIG. 1, the oil gauge 16 is shown schematically and includes the conduit 32 filled with a first fluid 36 and a second fluid 35. The first fluid 36 and the second fluid are immiscible fluids at normal operating conditions Immiscible fluids do not mix with each other during normal operating conditions and therefore provide a clear defined demarcation 50 that provides a visual cue that corresponds with the current vehicle operating condition. The immiscible fluids in one disclosed example, are of different densities to prevent mixing. Accordingly, in one disclosed embodiment, the first fluid 36 is of different density than the second fluid 35 to prevent mixing therebetween and provide the visible demarcation 50. Normal operating conditions can include a defined temperature and pressure range. In this disclosed embodiment, the normal operating conditions are typical ambient conditions for a motor vehicle. In this disclosed example, the liquids 35 and 36 are provided in a conduit 32 that is in communication at each end with one of two bellows 40A and 40B. Each bellows 40A, 40B expand and contract to provide the pressure required to move the demarcation 50 between the first and second fluid 36, 35 to follow the pointer 30 and indicate the current vehicle operating parameter.

The first fluid 36 and the second fluid 35 may be of any type of fluid that are not mixable with each other when at typical environmental conditions encountered during operation of a motor vehicle. Moreover, although two fluids are disclosed by way of example, a single fluid may be provided that includes a front that is moveable by adjusting pressures within the conduit 32. As appreciated, each conduit 22, 32, and 34 may include different working fluids to generate the desired demarcation that tracks the vehicle operating parameter. The conduit 22, 32, 34 can be shaped as desired to track along the corresponding dial gauge or may also be shaped to provide a desired aesthetic appearance. Moreover, although each of the conduits are associated with one of the dial gauges, a conduit could be provided at different locations and adjusted to provide a desired appearance independent of vehicle operation.

A controller 38 governs operation of the bellows 40A, 40B to generate the pressure differential in each fluid 36, 35 that adjusts the position of the demarcation 50. The bellows 40A, 40B are shown schematically and may be of any configuration provided to adjust pressures within the conduit 32. The bellows 40A, 40B may be located in a visible location to provide a desired aesthetic feature of the instrument cluster 10. The bellows 40A, 40B may also be concealed from view. Each conduit 22, 32, and 34 will include a set of bellows 40A and 40B that provide independent movement of fluids to provide movement of the demarcation 50 as appropriate to mark operation.

In one disclosed embodiment a light source 42A, 42B is provided at each end of each conduit 22, 32 and 34 to illuminate the conduit and the fluids 36, 35. The light source 42A, 42B in one example embodiment is a red, green, blue led device that enables illumination in different colors. The light sources 42A, 42B are operated by the controller 38 and can be further coordinated with the vehicle operating parameter. For example, the conduits can be illuminated a warning color such as red when approaching undesirable high or low values. For example, the lights 42A, 42B may be illuminated red when the oil pressure is below a predefined threshold value. The lights may be illuminated green when within acceptable limits. Moreover. The color of the lights 42A, 42B may by illuminated a color that is coordinated with a vehicle desire aesthetic appearance.

Figure 3:
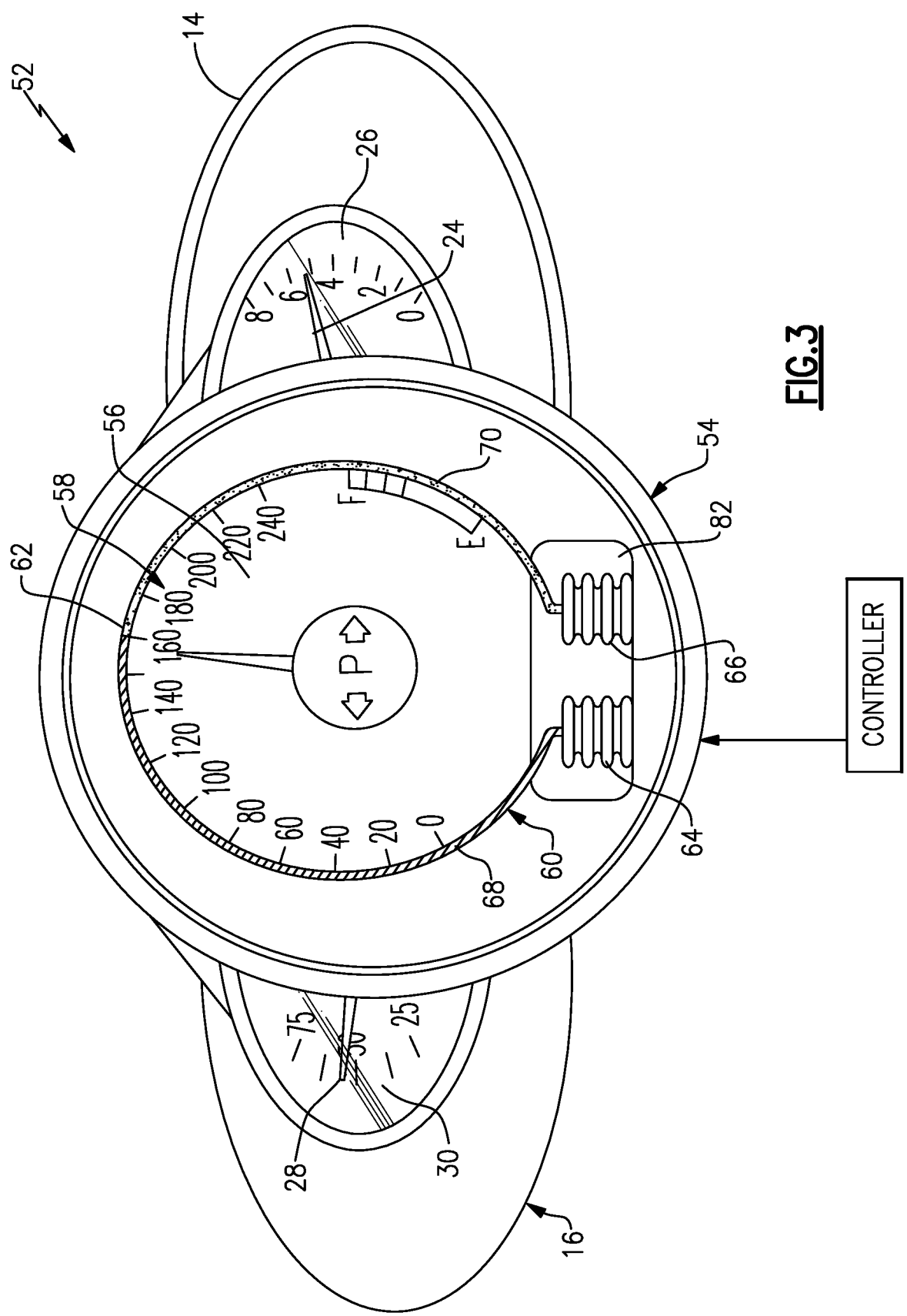
FIG. 3 is a front view of another example instrument panel embodiment.
Figure 4:
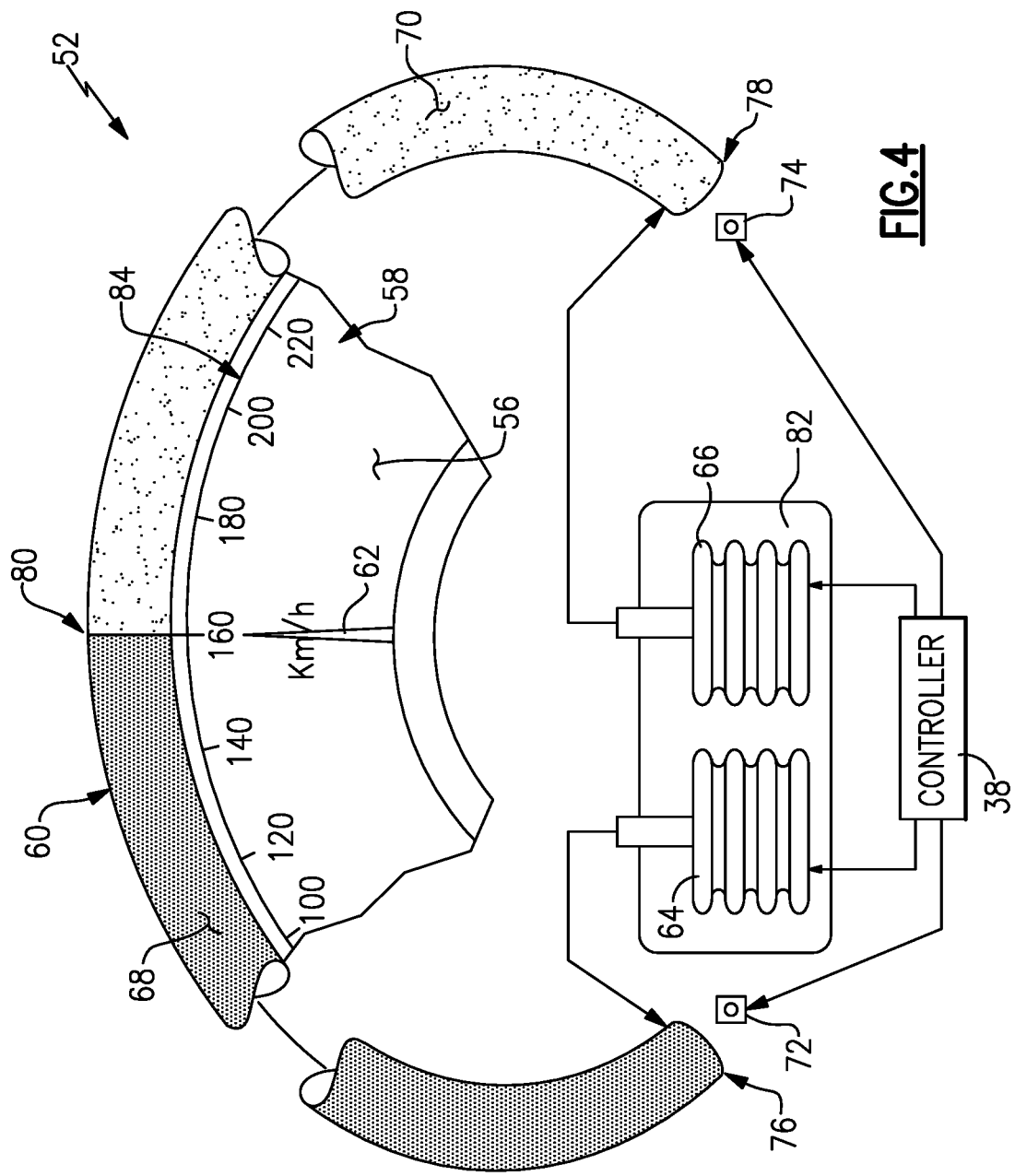
FIG. 4 is a schematic view of a portion of the example instrument panel shown in FIG. 3.

Referring to FIGS. 3 and 4, another example instrument cluster assembly embodiment is indicated at 52 and includes a speedometer 54 located between an oil pressure gauge 16 and a tachometer 14. The example speedometer 54 includes a window 82 through which a first bellows 64 and a second bellows 66 are visible. The first bellows 64 is in communication with a first end 76 of a fluid conduit 60. The second bellows 66 is in communication with a second end of 78 of the conduit 60. The conduit 60 includes a first fluid 68 and a second fluid 70. The first fluid 68 is immiscible with the second fluid 70 such that a defined and visible demarcation 80 is present and adjusted by actuation of the bellows 64, 66. The visible demarcation 80 moves in coordination with the pointer 62 to provide a secondary indication of the vehicle operating parameter measured by the speedometer 54. In this disclosed example, the demarcation 80 provides an indication of vehicle speed.

The conduit 60 is disposed about an outer periphery 84 a scale 58 on dial face 56 on which the pointer 62 indicates. In this example, the scale 58 is a circular shape with reference numerals disposed within an annular sweep of the pointer 62. The example conduit 60 may be any curvilinear shape that corresponds with a shape of the corresponding scale. As is show in the example instrument cluster assembly 10 shown in FIGS. 1 and 2, the conduit 32 may only be partially disposed about the periphery of an example scale. In the example disclosed in FIGS. 3 and 4, the conduit 60 is disposed about the entire outer periphery of the scale 58.

The first fluid 68 in this disclosed embodiment includes a visible color and the second fluid 70 substantially clear. The clear second fluid 70 generates the appearance that the first fluid 68 is flowing to move the visual demarcation 80 to indicate the current value of the measured vehicle operating parameter. It should be appreciated, that the second fluid 70 may be a visible color rather than clear to provide different visual aesthetic that matches other vehicle color schemes.

The example instrument cluster 52 includes a first light source 72 and a second light source 74. The first light source 72 is disposed at the first end 76 and the second light source 74 is disposed at the second end of the conduit 60. The light sources 72, 74 can be LEDs of a single color or a red/green/blue RGB Led that enables changing of colors. Light from the light sources 72, 74 is communicated into the conduit 60 and thereby by the one of the first fluid 68 and the second fluid 70. In one disclosed example embodiment, the first fluid 68 is luminescent and illuminates in response to light within the conduit 60 and the second fluid 70 is not luminescent and remains clear in response to light within the conduit 60.

The first fluid 68 and the second fluid 70 are stored within the conduit 60 and a corresponding one of the first bellows 64 and the second bellows 66. The amount of both the first fluid 68 and the second fluid 70 is sufficient to extend the visual demarcation 80 entirely about the scale 58. Moreover, the storage capacity of both the first bellows 64 and the second bellows 66 is sufficient to accommodate an amount of the corresponding fluids 68, 70 to accommodate movement to extreme ends of the scale 58.

In operation, a vehicle controller schematically shown at 38 controls both first bellows 64 and the second bellows 66 to adjust a location of the demarcation 80. The demarcation 80 in this example corresponds with the vehicle speed and the pointer 62. The corresponding one of the first bellows 64 and the second bellows 66 either pumps or pushes one of the fluids outward into the conduit 60 while the other of the bellows 64, 66 accepts fluid to make room within the conduit 60 for the expanding fluid 68, 70. Movement of the demarcation is thereby controlled by expansion of one the bellows and a corresponding collapsing of the other bellows.

The disclosed example instrument cluster and gauges provide an additional visual indicator of a vehicle operating parameter with immiscible fluids within a common conduit to provide a unique aesthetic appearance.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle instrument cluster comprising:
a gauge including a dial face defining a scale indicative of a vehicle operating parameter; and
a conduit containing a first fluid and a second fluid that are immiscible at normal operating conditions, the first fluid and the second fluid disposed relative to the scale, the first fluid and the second fluid in the conduit including a visible demarcation that is adjusted to correspond with the current vehicle operating parameter indicated on the scale, wherein the first fluid and the second fluid are of different densities to prevent mixing.

2. The vehicle instrument cluster as recited in claim 1, including a first bellows controlling movement of the first fluid and a second bellows controlling movement of the second fluid and the visible demarcation is disposed between the first fluid and the second fluid and is positioned within the conduit to indicate the current vehicle operating condition.

3. The vehicle instrument cluster as recited in claim 2, including a controller in communication with the first bellows and the second bellows for controlling movement to adjust the visible demarcation relative to the scale.

4. The vehicle instrument cluster as recited in claim 2, including a window within the dial face with the first bellows and the second bellows disposed proximate the window such that the first bellows and the second bellows are viewable through the window.

5. The vehicle instrument cluster as recited in claim 2, including a pointer movable to indicate on the scale that corresponds with movement of the visible demarcation between the first fluid and the second fluid.

6. The vehicle instrument cluster as recited in claim 2, wherein the first fluid is of a first color and the second fluid is of a second color different than the first color.

7. The vehicle instrument cluster as recited in claim 6, wherein the second color is clear relative to the first color.

8. The vehicle instrument cluster as recited in claim 2, including a light for illuminating the conduit.

9. The vehicle instrument cluster as recited in claim 7, wherein at least one of the first fluid and the second fluid is luminescent and illuminates in response to the light within the conduit.

10. The vehicle instrument cluster as recited in claim 9, wherein the wherein the second fluid is not luminescent and remains clear in response to light within the conduit.

11. The vehicle instrument cluster as recited in claim 1, wherein the scale is arranged circumferentially on the dial face and the conduit is disposed about a periphery of the scale.

12. A vehicle instrument cluster comprising:
a gauge including a dial face defining a scale indicative of a vehicle operating parameter; and
a conduit containing at least one fluid disposed relative to the scale, the at least one fluid in the conduit including a visible demarcation that is adjusted to correspond with the current vehicle operating parameter indicated on the scale, wherein the scale is arranged as a partial curvilinear shape and the conduit is disposed about an outer periphery of the partial curvilinear shape.

13. A gauge assembly for a communicating an operating parameter comprising:
a dial face defining a scale indicative of an operating parameter;
a conduit containing a first fluid and a second fluid that are immiscible during normal operating conditions, the conduit arranged about a periphery of the scale, wherein a visible demarcation between the first fluid and the second fluid is movable to correspond with the current operating parameter indicated on the scale;
a first bellows in communication with a first end of the conduit for moving the first fluid within the conduit; and
a second bellows in communication with a second end of the conduit for moving the second fluid within the conduit, wherein the first bellows and the second bellows are selectively expandable and collapsible to move a corresponding one of the first fluid and the second fluid to adjust a position of the visible demarcation relative to the scale.

14. The gauge assembly as recited in claim 13, wherein the scale is arranged circumferentially on the dial face and the conduit is disposed about a periphery of the scale.

15. The gauge assembly as recited in claim 13, wherein the scale is arranged as a partial curvilinear shape and the conduit is disposed about an outer periphery of the partial curvilinear shape.

16. The gauge assembly as recited in claim 13, wherein the first fluid is luminescent and illuminates in response to the light within the conduit and the second fluid is not luminescent and remains clear in response to light within the conduit.

17. The gauge assembly as recited in claim 13, wherein the first fluid is of a first color and the second fluid is of a second color different than the first color.

18. The gauge assembly as recited in claim 13, wherein the scale is arranged as a curvilinear shape and the conduit is disposed about an outer periphery of the curvilinear shape.

19. A vehicle instrument cluster comprising:
a gauge including a dial face defining a scale indicative of a vehicle operating parameter; a pointer that is movable relative to the dial face and scale for indicating the current vehicle operating parameter; and
a conduit containing at least one fluid disposed about an outer periphery of the scale, the at least one fluid in the conduit including a visible demarcation that is adjusted to correspond with the current vehicle operating parameter indicated on the scale.

20. The vehicle instrument cluster as recited in claim 19, wherein the scale is arranged as a partial curvilinear shape and the conduit is disposed about the outer periphery of the partial curvilinear shape.

* * * * *